United States Patent
Gregard et al.

(10) Patent No.: US 12,467,309 B2
(45) Date of Patent: Nov. 11, 2025

(54) CONTACT PROTECTING EDGE STRUCTURE ON GLASS LAMINATES

(71) Applicant: ChromoGenics AB, Uppsala (SE)

(72) Inventors: Greger Gregard, Uppsala (SE); Niklas Lundberg, Alunda (SE)

(73) Assignee: ChromoGenics AB, Uppsala (SE)

( * ) Notice: Subject to any disclaimer, the term of this patent is extended or adjusted under 35 U.S.C. 154(b) by 711 days.

(21) Appl. No.: 17/786,415

(22) PCT Filed: Dec. 17, 2020

(86) PCT No.: PCT/SE2020/051227
§ 371 (c)(1),
(2) Date: Jun. 16, 2022

(87) PCT Pub. No.: WO2021/126066
PCT Pub. Date: Jun. 24, 2021

(65) Prior Publication Data
US 2023/0020314 A1    Jan. 19, 2023

(30) Foreign Application Priority Data
Dec. 20, 2019    (SE) .................................... 1951535-2

(51) Int. Cl.
*E06B 3/67* (2006.01)
*B32B 3/08* (2006.01)
(Continued)

(52) U.S. Cl.
CPC .............. *E06B 3/6722* (2013.01); *B32B 3/08* (2013.01); *B32B 7/12* (2013.01);
(Continued)

(58) Field of Classification Search
CPC ........ B32B 2307/202; B32B 2307/412; B32B 17/10055; E06B 2009/2464
See application file for complete search history.

(56) References Cited

U.S. PATENT DOCUMENTS

2005/0237595 A1   10/2005   Nakaho
2006/0050357 A1   3/2006    Gavrilov et al.
(Continued)

FOREIGN PATENT DOCUMENTS

WO    2015016764 A1    2/2015
WO    2017198585 A1    11/2017

OTHER PUBLICATIONS

Search Report issued in PCT/SE2020/051227 dated Feb. 2, 2021.

*Primary Examiner* — Laura A Auer
(74) *Attorney, Agent, or Firm* — Fox Rothschild LLP; Carol E. Thorstad-Forsyth

(57) ABSTRACT

A laminated glass pane (1) comprises a first glass pane (10A), a second glass pane (10B) and an optically active film (20) laminated between the glass panes. The optically active film comprises a first conductive layer and a second conductive layer separated by at least one intermediate layer. The first and second conductive layers are contacted by a first (12A) and second (12B) connection wire, respectively. The optically active film is fully covered by both glass panes. Both the first and the second connection wires protrude out from the active film passing a first edge (14A) of the first glass pane in a same direction (18). The second glass pane protrudes outside the first edge of the first glass pane in the direction by an off-set distance (16). The off-set distance is at least equal to a smallest width of the first and second connection wires.

20 Claims, 5 Drawing Sheets

(51) Int. Cl.
*B32B 7/12* (2006.01)
*B32B 17/10* (2006.01)
*E06B 3/663* (2006.01)
*E06B 9/24* (2006.01)
*B32B 9/04* (2006.01)
*B32B 25/18* (2006.01)
*B32B 27/30* (2006.01)
*B32B 27/36* (2006.01)

(52) U.S. Cl.
CPC .... *B32B 17/10513* (2013.01); *E06B 3/66309* (2013.01); *E06B 9/24* (2013.01); *B32B 9/04* (2013.01); *B32B 25/18* (2013.01); *B32B 27/30* (2013.01); *B32B 27/306* (2013.01); *B32B 27/36* (2013.01); *B32B 2250/40* (2013.01); *B32B 2255/00* (2013.01); *B32B 2307/202* (2013.01); *B32B 2307/412* (2013.01); *E06B 2009/2464* (2013.01)

(56) References Cited

U.S. PATENT DOCUMENTS

| | | |
|---|---|---|
| 2009/0303565 A1 | 12/2009 | Karmhag et al. |
| 2016/0085128 A1 | 3/2016 | Karmhag et al. |
| 2016/0136930 A1 | 5/2016 | Gregard et al. |
| 2016/0161818 A1* | 6/2016 | Gregard ............. G02F 1/13439 29/846 |
| 2017/0028686 A1* | 2/2017 | Wilson .................... B32B 7/05 |
| 2019/0036480 A1 | 1/2019 | Barr et al. |

* cited by examiner

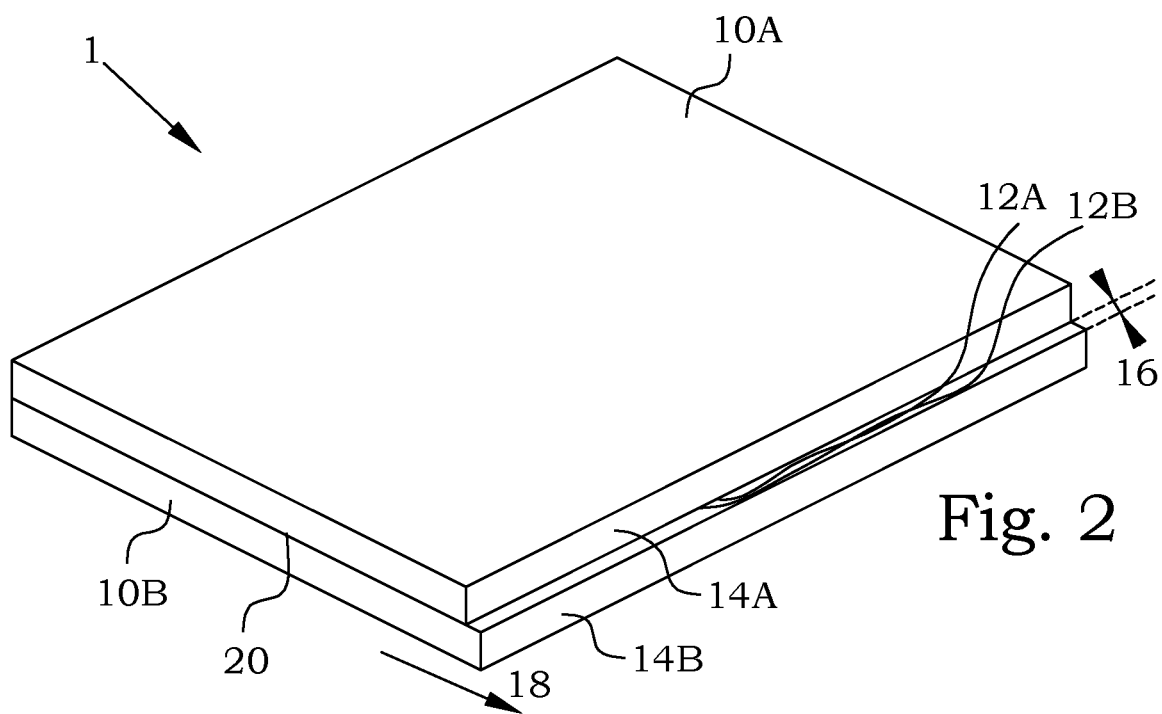

CONTACT PROTECTING EDGE STRUCTURE ON GLASS LAMINATES

RELATED APPLICATION DATA

The present application is a National Phase of International Patent Application No. PCT/SE2020/051227, which was filed on Dec. 17, 2020, entitled "CONTACT PROTECTING EDGE STRUCTURE ON GLASS LAMINATES" and claims priority to Sweden Patent Application No. 1951535-2 which was filed on Dec. 20, 2019. The contents of these applications are incorporated herein by reference in its entirety.

TECHNICAL FIELD

The technology presented here relates in general to glass pane arrangements and in particular to glass pane arrangements having incorporated active optical property control devices.

BACKGROUND

Buildings today often incorporate large windows, typically aiming in allowing light into the building and to provide outside view for people within the building. However, in very sunny weather, the windows may introduce too much light. The window may also allow too much heat to enter into the building. At the contrary, in cold weather the windows may allow too much heat to leave the building. It is therefore very common to provide the glass panes with different kinds of active or passive foils or coatings changing the optical properties of the glass pane. One approach, providing a good protection of the optically modifying foils is to laminate or by other means providing such foils or coatings between two glass panes. The foils or coatings are thus protected from humidity and mechanical wear, such as scratches etc.

Active foils or coatings for changing optical properties are typically controlled by electrical wires, connected to the active foils. A control unit outside the window can then be used for controlling the optical properties of the foil or coating. The wires are typically connected to conducting meshes, bus bars or thin conducting layers within the foils or coatings. A typical example of an active device for changing optical properties is an electrochromic device, changing its transparency in dependence of an applied voltage and/or current.

Since the active device is provided between two glass panes, the electrical wires will stick out from the glass panes from the sides thereof from a position between the glass panes. In other words, the wires protrude through an edge of the laminated glass pane.

Laminated glass panes are in general heavy. In particular, windows and façade elements intended for building purposes have often a large area and the weight of the laminated glass pane may be considerable. When manufacturing, storing, storing, and mounting, different lifting tools are typically used in order to handle the large and heavy items. In such situations, it is not uncommon that the edge of a laminated glass pane is moved in mechanical contact against another surface, e.g. a floor, a wall or a part of a lifting device. The risk for damaging electrical wires sticking out from between the glass pane is evident. Such damages are typically not very easy to repair, since the actual connection point of the wires typically is provided a distance inside the laminated glass pane edge.

SUMMARY

A general object of the technology presented here is thus to provide a protection for wiring of glass pane assembly having active optical devices provided between glass panes.

The above object is achieved by methods and devices according to the independent claims. Preferred embodiments are defined in dependent claims.

In general words, a laminated glass pane comprises a first glass pane, a second glass pane and an optically active film laminated between the first glass pane and the second glass pane. The optically active film comprises a first conductive layer and a second conductive layer separated by at least one intermediate layer. The first and second conductive layers are contacted by a first and second connection wire, respectively. The optically active film is fully covered by both the first glass pane and the second glass pane. Both the first connection wire and the second connection wire protrude out from the active film passing a first edge of the first glass pane in a same direction. The second glass pane protrudes outside the first edge of the first glass pane in the direction by an off-set distance. The off-set distance is at least equal to a smallest width of the first and second connection wires.

One advantage with the proposed technology is that the probability for unintended damage to the connection wires is reduced. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 2 illustrates schematically an embodiment of a laminated glass pane;

DETAILED DESCRIPTION

Throughout the drawings, the same reference numbers are used for similar or corresponding elements.

Figure 1A:
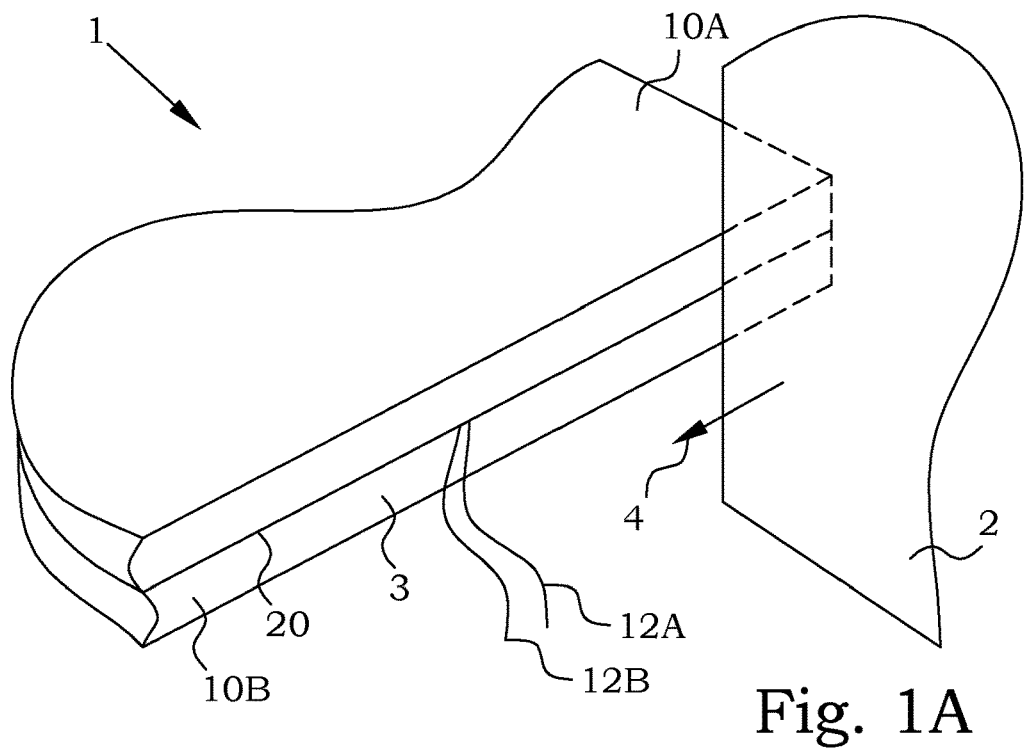
FIGS. 1A-B illustrate damage of connection wires when a solid item is scraped along an edge of a laminated glass pane.
Figure 1B:
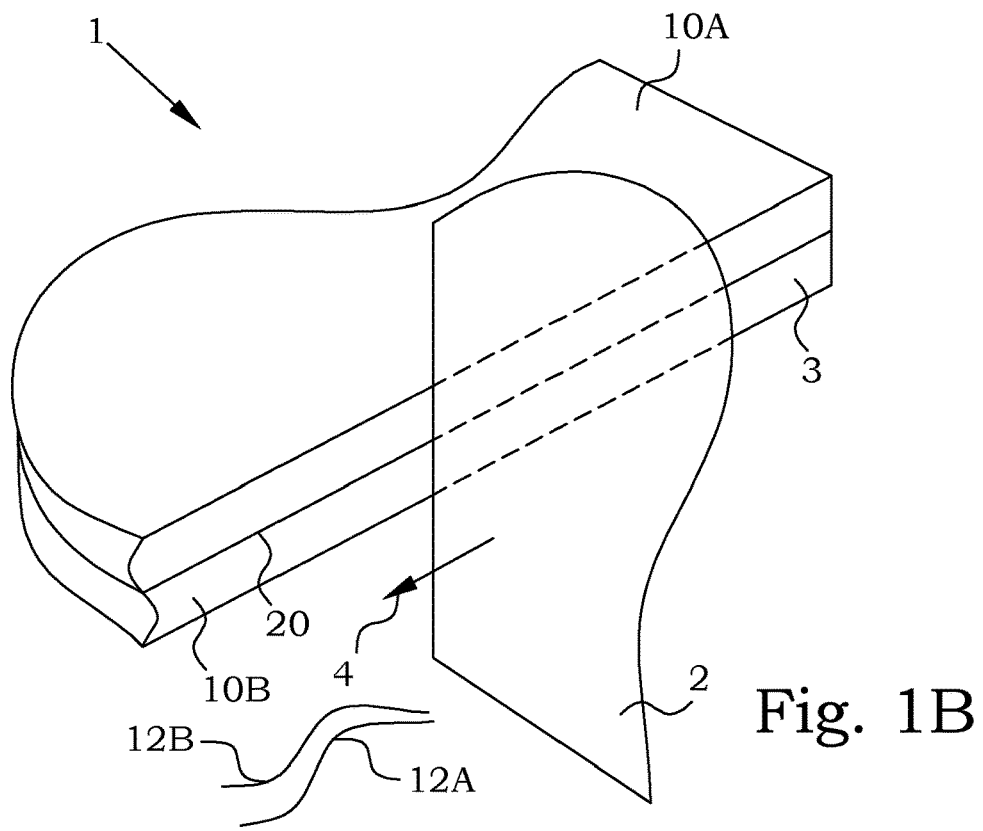

In order to further understand the problem, a schematic illustration is shown in FIGS. 1A and 1B. A glass pane assembly 1 comprising two glass panes 10A, 10B with an active optical device 20 laminated therebetween is illustrated. Two wires 12A, 12B protrudes from an edge 3 of the glass pane assembly 1. In FIG. 1A, an edge of a solid item 2 is in contact with the edge 3 of the glass pane assembly 1 and is moved relative to the edge 3 of the glass pane assembly 1 in the direction of the arrow 4. In FIG. 1B, the edge of the solid item 2 has passed the position where the wires 12A, 12B protruded and has damaged the wires 12A, 12B, in this case cut off the wires 12A, 12B, at a place difficult to repair.

FIG. 2 illustrates a schematic illustration of an embodiment of a laminated glass pane 1. The laminated glass pane 1 comprises a first glass pane 10A, a second glass pane 10B and an optically active film 20 laminated between the first glass pane 10A and the second glass pane 10B. As will be discussed further below, the optically active film 20 comprises a first conductive layer and a second conductive layer separated by at least one intermediate layer. The first and second conductive layers are contacted by a first 12A and second 12B connection wire, respectively. The optically active film 20 is fully covered by both the first glass pane 10A and the second glass pane 10B.

Both the first connection wire 12A and the second connection wire 12B protrude out from the active film 20 passing a first edge 14A of the first glass pane 10A in a same direction, illustrated by the arrow 18. The second glass pane 10B protrudes outside the first edge 14A of the first glass pane 10A in the direction 18 by an off-set distance 16.

The off-set distance 16 is at least equal to a smallest width of the first 12A and second 12B connection wires. In this way, there is always space for the connection wires 12A, 12B outside the first edge 14A of the first glass pane 10A and inside a second edge 14B of the second glass pane 10B. A space is created by the off-set distance 16 above (as illustrated) the second glass pane 10B that is large enough to accommodate the connection wires 12A, 12B.

Preferably, the off-set distance 16 is at least equal to twice the smallest width of the first 12A and second 12B connection wires and even more at least 3 times the smallest width of the first 12A and second 12B connection wires, to provide space for the connection wires 12A, 12B side by side on the second glass pane 10B inside a second edge 14B. The smallest width of the connection wires 12A, 12B is typically the smallest cross-section measure including any insulation. For an essentially cylindrical connection wire, this measure becomes equal to the radius. For a flat connection wire, this measure is the thickness perpendicular to the plane of the flatness.

In principle, the distance 16 can be large. However, since the protruding area of the second glass pane 10B is inactive, there is typically a general request to keep it relatively limited. Since the protective idea is operable for all measures, there is no absolute limit, but other considerations will probably limit the distance 16 to be less than 10-20 times the smallest width of the first 12A and second 12B connection wires.

Figure 3:
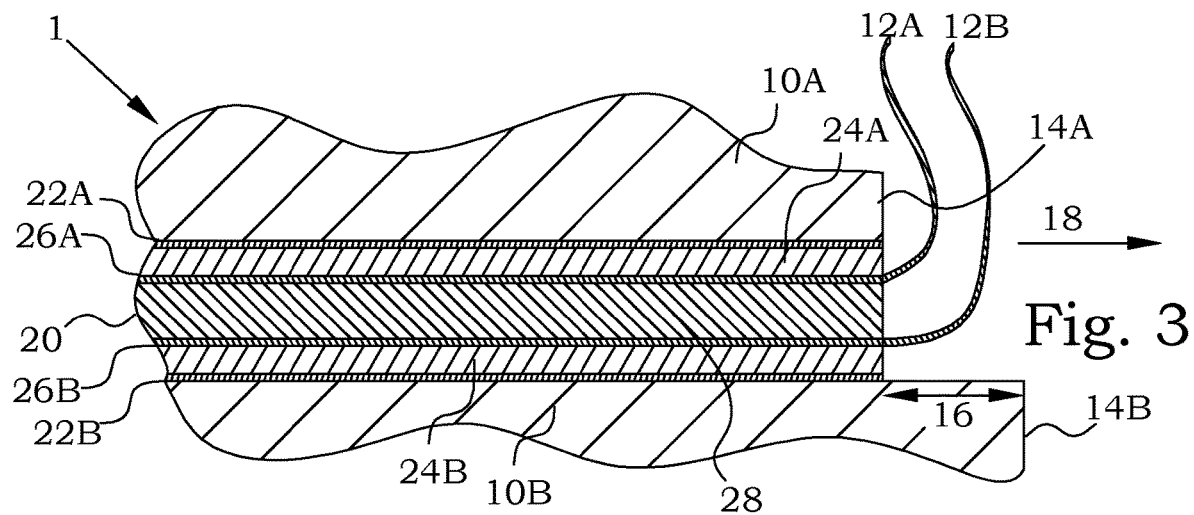
FIG. 3 illustrates a part of the embodiment of FIG. 2 in a cross-sectional view.

In FIGS. 3, a part of the embodiment of the laminated glass pane 1 is illustrated in a cross-sectional view. The optically active film 20 comprises a first conductive layer 26A and a second conductive layer 26B separated by at least one intermediate layer 28. The intermediate layer is typically an optically active layer.

Thus, in one embodiment, the optically active film 20 is able to change its optical properties as a response to applied electrical signals on the first 12A and second 12B connection wires.

The optically active film may e.g. be an electrochromic film. Such a film typically comprises two electrochromic layers and an electrolyte. In other words, in one embodiment, the optically active film 20 is an electrochromic film. In a further embodiment, the intermediate layer 28 of the electrochromic film comprises two electrochromic layers and an electrolyte. In one embodiment, the electrochromic film is able to change a transparency depending on a voltage applied between the first 10A and second 10B connection wires.

In this particular embodiment, the optically active film 20 is provided between two polymer films 24A, 24B typically polyethylene (PET). In this particular embodiment, the stack of polymer films 24A, 24B and the optically active film 20 are laminated by respective interlayer foils 22A, 22B. The interlayer foils may e.g. be made of PVB or EVA. In other words, the polymer films 24A, 24B are laminated to the first 10A and second 10B glass pane, respectively, by a respective interlayer foil 22A, 22B.

The first 26A and second 26B conductive layers are contacted by the first 12A and second 12B connection wire, respectively. The optically active film 20 is fully covered by both the first glass pane 10A and the second glass pane 10B.

Note that the relative thicknesses of the different parts of the figures in the present disclosure are not intended to be drawn in a proper scale, but only to illustrates the existence of the different parts.

Figure 4:
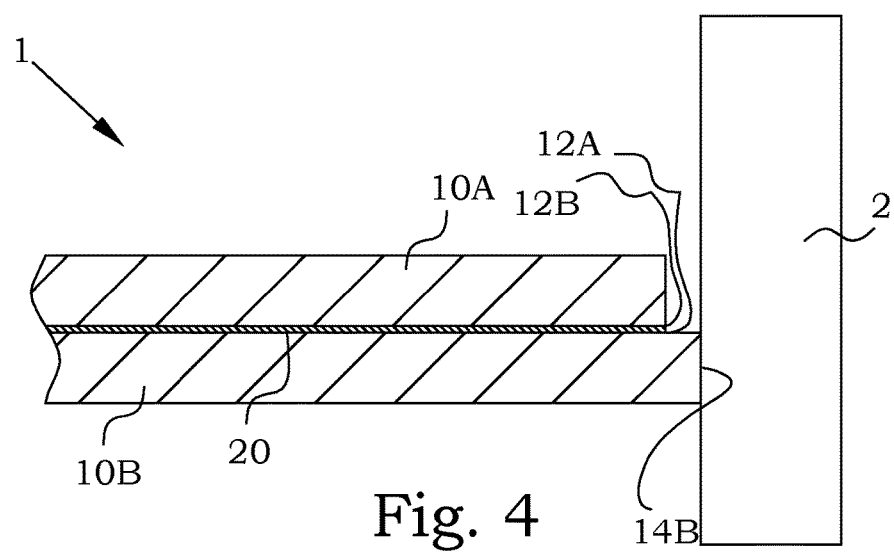
FIG. 4 illustrates the protective properties of a laminated glass pane with one protruding glass pane.

FIG. 4 illustrates the embodiment of the laminated glass pane 1, when being in mechanical abrasive contact with a solid item 2. The connection wires 12A, 12B are narrow enough to be housed in the volume above the protruding part of the second glass pane 10B. Even if the solid item 2 is scraped in a direction transverse to the plane of figure, there is no risk for the connection wires 12A, 12B to be damaged, or at least a significantly lower risk.

In the embodiment of FIG. 3, the optically active film 20 is an electrochromic film. The intermediate layer 28 of the electrochromic film typically comprises two electrochromic layers and an electrolyte. In this embodiment, the optically active film 20 is provided between the two polymer films 24A, 24B. Due to the mechanically bearing polymer films 24A, 24B, this assembly can be provided, as such, before being laminated between the glass panes. Also, the connection wires 12A and 12B are easily provided in electrical contact with the first 26A and second 26B conductive layers prior to the lamination. In the lamination process, the interlayer foils 22A, 22B are provided on each side of the polymer films 24A, 24B, acting as a bonding material against the glass panes.

In a particular embodiment, one or both of the interlayer foils 22A, 22B may be allowed to cover also the part of the second glass pane 10B that eventually will protrude outside the first glass pane 10A. The connection wires 12A and 12B may be placed in an intended final position and can thereby be fixed against the second glass pane 10B by means of the interlayer foils 22A, 22B during the lamination process. In other words, at least one of the interlayer foils 22A, 22B also bonds the first connection wire 12A and the second connection wire 12B to the portion of the second glass pane 10B protruding outside the first glass pane 10A.

Figure 5:
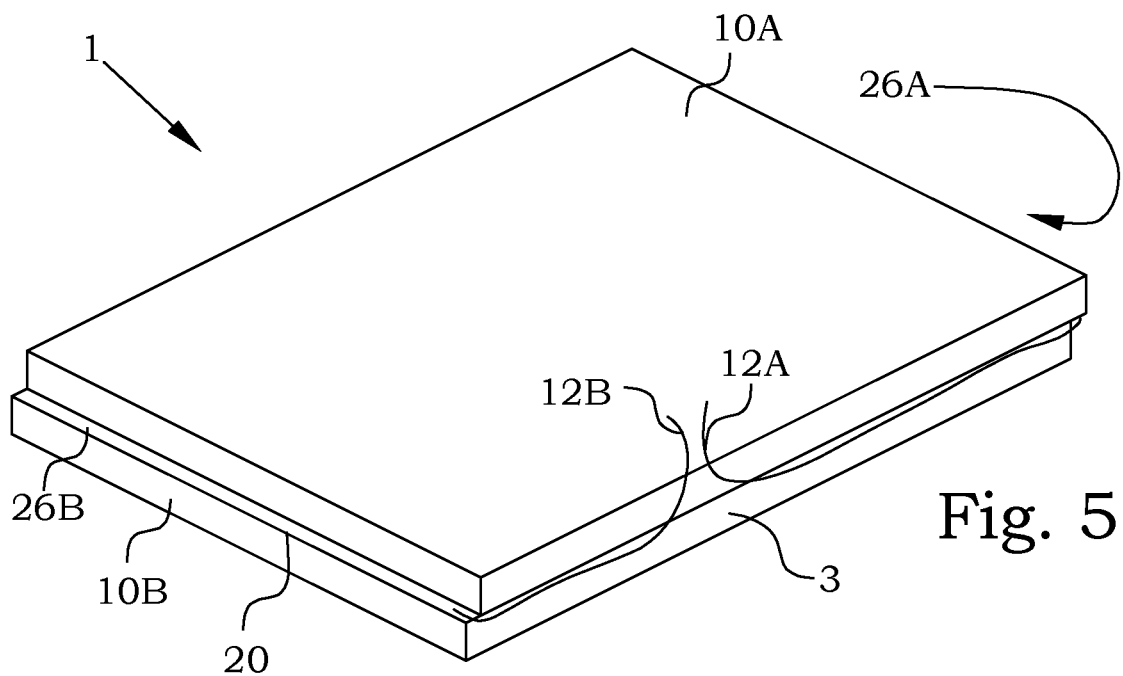
FIG. 5 illustrates a prior art laminated glass pane.

In different prior art glass pane assemblies, a relative displacement of glass panes has been used. FIG. 5 illustrates such an approach. In such an embodiment, there are protruding part on both sides of the laminated glass pane 1, one for each glass pane 10A, 10B. These the protruding parts of the glass panes 10A, 10B are provided to facilitate connection of connection wires to the conductive layers 26A, 26B. This approach is typically used when the connection wires 12A and 12B are to be connected after lamination. The respective conductive layers 26A, 26B are then allowed to cover also the protruding part of the respective glass pane 10A, 10B, and contacting of the connection wires 12A and 12B are facilitated. A disadvantage with this approach is the connection wires 12A and 12B are connected on opposite sides of the laminated glass pane 1, which typically is not wanted. Therefore, the connection wires 12A and 12B are typically brought to one common edge 3 as illustrated in the figure. However, this again cause the above discussed risk of damaging the connection wires 12A and 12B at the place where they stick out from the common edge 3.

Figure 6:
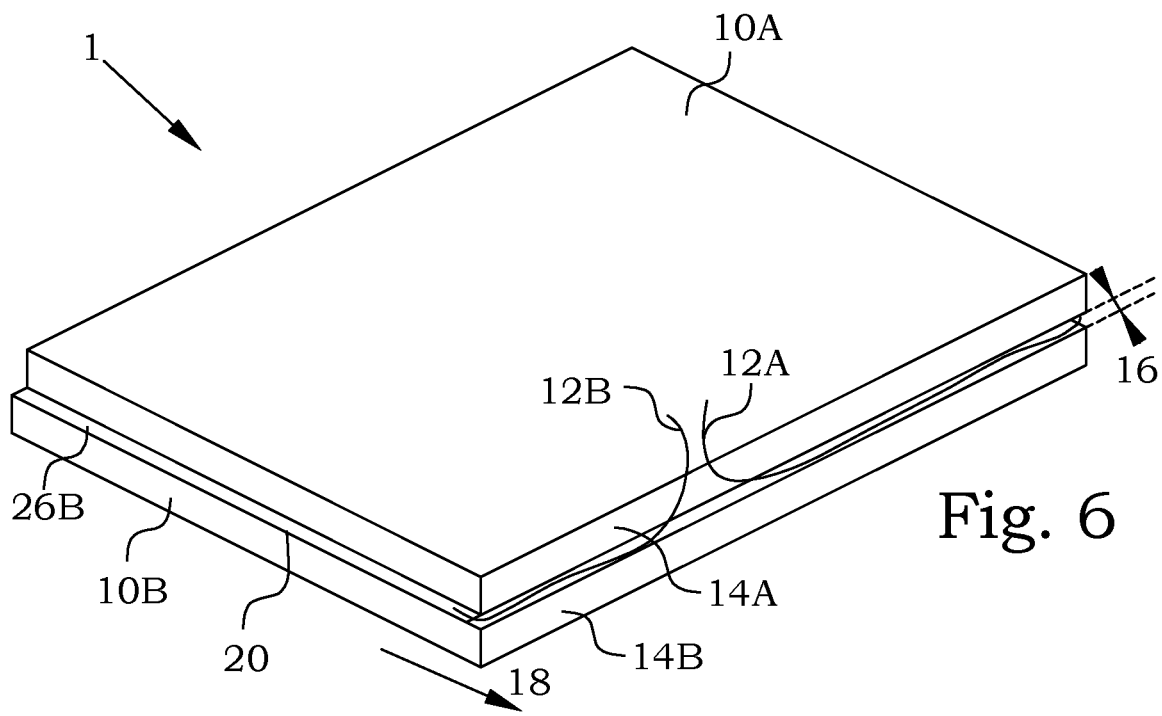
FIG. 6 illustrates schematically another embodiment of a laminated glass pane.

FIG. 6 illustrates an embodiment of the present technology, which also solves that problem. In this embodiment, a protruding part of the second glass pane 10B is also provided at one of the sides, creating a first edge 14A and a second edge 14B, separated by a distance 16. The connection wires 12A and 12B can thereby be brought together without passing outside the second edge 14B. Both the first connection wire 12A and the second connection wire 12B protrude out from the active film 20 passing the first edge 14A of the first glass pane 10A in the same direction 18. In order to achieve the protection against abrasive damage, the distance 16 thus has to be provided in the same direction 18 as both the connection wires 12A, 12B passes the first edge 14A.

Figure 7:
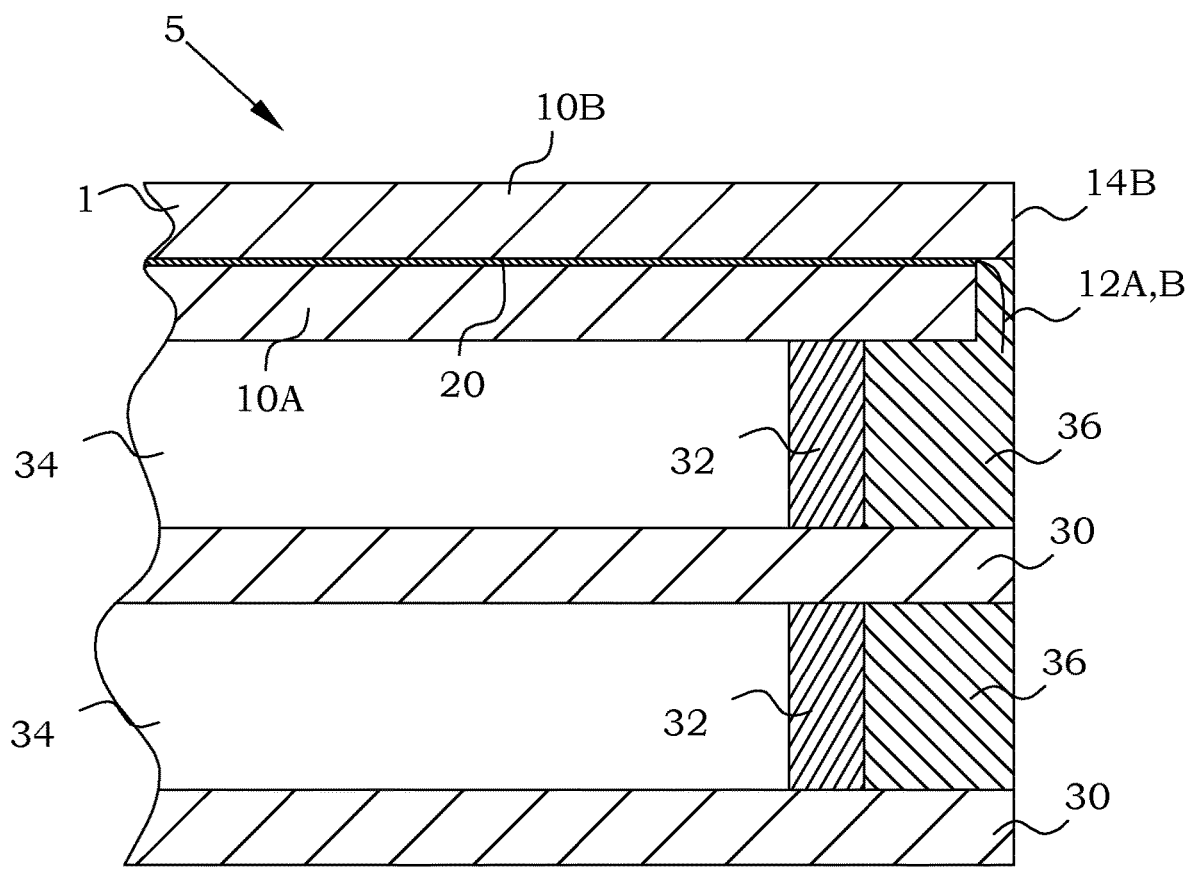
FIG. 7 illustrates an insulating glass unit (IGU) assembly.

The provision of a distance may also give additional advantages e.g. when the laminated glass pane is used as a part in more elaborate glass pane assemblies. FIG. 7 illustrates, as an example, an insulating glass unit (IGU) assembly 5, comprising a laminated glass pane 1, according to the above ideas, further attached to glass panes 30. In a typical embodiment, the glass panes 30 may be coated with a low-emission coating or any other optically active films. The glass panes 30 are separated from the laminated glass pane 1 and each other by distance elements 32, typically made of metal or polymers. The distance elements 32 may also incorporate e.g. dehydration substances that assist in keeping the volumes 34 between the glass panes 30 dry. The distance elements 32 are typically glued to the glass panes 30 and the laminated glass pane 1 by a primary sealing, e.g. butyl. The volumes 34 between the glass panes 30 are typically filled with argon gas and/or krypton gas to improve the thermal insulation performance. The distance elements 32 are typically sealed also with a secondary sealing 36. Usually some silicon-based materials are used for such secondary sealings.

In the figure, it can be noticed that by assembling the laminated glass pane 1 such that the protruding glass pane 10B is provided as an outer glass pane, the protruding distance creates a volume which can be filled by the secondary sealing 36, thus forming also a secondary sealing for the optically active film 20.

As any person skilled in the art understands, the above advantages will also be present when combining the laminated glass pane 1 with only one additional glass pane or with more than two other glass panes. Likewise, these advantages will also be present for all types of glass panes to the IGU, such as low-e glass, solar control glass or ordinary float glass.

In other words, a glass pane assembly may in one embodiment comprise a laminated glass pane according to the ideas presented above and at least one additional glass pane sealed by a primary sealing to the laminated glass pane. The first glass pane of the laminated glass pane faces the additional glass pane(s). A secondary sealing is provided between the additional glass pane(s) and the laminated glass pane. The secondary sealing fills at least the volume defined by the protrusion of the second glass pane.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A laminated glass pane, comprising:
   a first glass pane;
   a second glass pane;
   an optically active film laminated between said first glass pane and said second glass pane;
   said optically active film comprising a first conductive layer and a second conductive layer separated by at least one intermediate layer;
   said optically active film being fully covered by both said first glass pane and said second glass pane;
   whereby said second glass pane protrudes outside a first edge of said first glass pane in a first direction parallel to said first glass pane and said second glass pane by an off-set distance;
   said first and second conductive layers being contacted by a first and second connection wire, respectively;
   whereby both said first connection wire and said second connection wire protrude out from said active film passing said first edge of said first glass pane in said first direction;
   said off-set distance being at least equal to a smallest width of said first and second connection wires.

2. The laminated glass pane according to claim 1, wherein said optically active film being able to change its optical properties as a response to applied electrical signals on said first and second connection wires.

3. The laminated glass pane according to claim 2, wherein said optically active film being an electrochromic film.

4. The laminated glass pane according to claim 3, wherein said electrochromic film is able to change a transparency depending on a voltage applied between said first and second connection wires.

5. The laminated glass pane according to claim 3, wherein said intermediate layer of said electrochromic film comprises two electrochromic layers and an electrolyte.

6. The laminated glass pane claim 1, further comprising a respective polymer film between said first conductive layer and said first glass pane and between said second conductive layer and said second glass pane.

7. The laminated glass pane according to claim 6, wherein said polymer films are laminated to said first and second glass pane, respectively, by a respective interlayer foil.

8. The laminated glass pane according to claim 7, wherein at least one of said interlayer foils also bonds said first connection wire and said second connection wire to the portion of said second glass pane protruding outside said first glass pane.

9. An insulation glass unit assembly, comprising:
   a first glass pane;
   a second glass pane;
   an optically active film laminated between said first glass pane and said second glass pane;
   said optically active film comprising a first conductive layer and a second conductive layer separated by at least one intermediate layer;
   said optically active film being fully covered by both said first glass pane and said second glass pane;
   whereby said second glass pane protrudes outside a first edge of said first glass pane in a first direction parallel to said first glass pane and said second glass pane by an off-set distance;
   said first and second conductive layers being contacted by a first and second connection wire, respectively;
   whereby both said first connection wire and said second connection wire protrude out from said active film passing said first edge of said first glass pane in said first direction;

said off-set distance being at least equal to a smallest width of said first and second connection wires; and at least one additional glass pane sealed by a primary sealing to said laminated glass pane;

said first glass pane of said laminated glass pane facing said at least one additional glass pane; and a secondary sealing between said at least one additional glass pane and said laminated glass pane;

said secondary sealing filling the volume defined by a protrusion of said second glass pane.

10. The laminated glass pane according to claim 4, wherein said intermediate layer of said electrochromic film comprises two electrochromic layers and an electrolyte.

11. The insulation glass unit assembly according to claim 9, wherein said optically active film being able to change its optical properties as a response to applied electrical signals on said first and second connection wires.

12. The insulation glass unit assembly according to claim 11, wherein said optically active film being an electrochromic film.

13. The insulation glass unit assembly according to claim 12, wherein said electrochromic film is able to change a transparency depending on a voltage applied between said first and second connection wires.

14. The insulation glass unit assembly according to claim 12, wherein said intermediate layer of said electrochromic film comprises two electrochromic layers and an electrolyte.

15. The insulation glass unit assembly according to claim 9, wherein said intermediate layer of said electrochromic film comprises two electrochromic layers and an electrolyte.

16. The insulation glass unit assembly according to claim 15,
wherein said polymer films are laminated to said first and second glass pane, respectively, by a respective interlayer foil.

17. The insulation glass unit assembly according to claim 16,
wherein at least one of said interlayer foils also bonds said first connection wire and said second connection wire to the portion of said second glass pane protruding outside said first glass pane.

18. The insulation glass unit assembly according to claim 13, wherein said intermediate layer of said electrochromic film comprises two electrochromic layers and an electrolyte.

19. The laminated glass pane according to claim 2, further comprising a respective polymer film between said first conductive layer and said first glass pane and between said second conductive layer and said second glass pane.

20. The laminated glass pane according to claim 3, further comprising a respective polymer film between said first conductive layer and said first glass pane and between said second conductive layer and said second glass pane.

* * * * *